(12) United States Patent
Kohara et al.

(10) Patent No.: US 7,430,853 B2
(45) Date of Patent: Oct. 7, 2008

(54) APPARATUS FOR EVALUATING DETERIORATION CONDITION OF CATALYST OF INTERNAL COMBUSTION ENGINE

(75) Inventors: Yuichi Kohara, Toyota (JP); Takahiro Uchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/575,950

(22) PCT Filed: Dec. 27, 2004

(86) PCT No.: PCT/JP2004/019803

§ 371 (c)(1),
(2), (4) Date: Apr. 13, 2006

(87) PCT Pub. No.: WO2005/066472

PCT Pub. Date: Jul. 21, 2005

(65) Prior Publication Data

US 2007/0062177 A1    Mar. 22, 2007

(30) Foreign Application Priority Data

Jan. 6, 2004    (JP)    ............................. 2004-001017
Dec. 6, 2004    (JP)    ............................. 2004-353309

(51) Int. Cl.
*F01N 3/00*    (2006.01)
(52) U.S. Cl. .............................. 60/277; 60/276; 60/285; 60/297; 701/103; 701/109
(58) Field of Classification Search .................. 60/274, 60/276, 277, 285, 297, 301; 701/103, 109
See application file for complete search history.

(56) References Cited

U.S. PATENT DOCUMENTS

| 5,220,788 A | 6/1993 | Kurita et al. |
| 5,406,789 A | 4/1995 | Takizawa et al. |
| 5,948,974 A | 9/1999 | Mitsutani |
| 5,966,930 A | 10/1999 | Hatano et al. |
| 6,185,929 B1 * | 2/2001 | Ishizuka et al. ............... 60/274 |
| 6,539,707 B2 * | 4/2003 | Ikemoto et al. ............... 60/285 |
| 6,834,497 B2 * | 12/2004 | Miyoshi et al. ............... 60/277 |
| 6,839,637 B2 * | 1/2005 | Moteki et al. .................. 702/23 |
| 2003/0070420 A1 | 4/2003 | Uchida |

FOREIGN PATENT DOCUMENTS

| EP | 0 475 177 A2 | 3/1992 |
| EP | 0 878 611 A2 | 11/1998 |
| JP | A-6-129285 | 5/1994 |
| JP | A-6-159048 | 6/1994 |
| JP | A-2001-132435 | 5/2001 |

* cited by examiner

*Primary Examiner*—Binh Q Tran
(74) *Attorney, Agent, or Firm*—Oliff & Berridge, PLC (57) ABSTRACT

To provide an apparatus for evaluating the deterioration condition of a catalyst of an internal combustion engine that can improve the accuracy of an evaluation of the deterioration condition of a catalyst and can suppress a worsening of emissions. The apparatus forcedly sets the air/fuel ratio upstream of a catalyst provided in an exhaust system of an internal combustion engine at a rich condition or a lean condition on the basis of a detected value of a sub $O_2$ sensor downstream of the catalyst in the internal combustion engine and evaluates the deterioration condition of the catalyst. The air/fuel ratio control is reversed so that the air/fuel ratio upstream of the catalyst becomes a lean condition or a rich condition when 'egasum' has reached a predetermined value Ga, 'egasum' being an integrated value of an admitted air volume (an integration count of the amount of exhaust gas passing through the catalyst) in the period after the sub $O_2$ sensor outputs a detected value, which shows a rich condition or a lean condition, until the reversing of the output of the sub $O_2$ sensor.

5 Claims, 9 Drawing Sheets

APPARATUS FOR EVALUATING DETERIORATION CONDITION OF CATALYST OF INTERNAL COMBUSTION ENGINE

TECHNICAL FIELD

The present invention relates to an apparatus for evaluating the deterioration condition of a catalyst of an internal combustion engine and, more particularly, to an apparatus for evaluating the deterioration condition of a catalyst of an internal combustion engine that can improve the accuracy of an evaluation of the deterioration condition of a catalyst and can suppress a worsening of emissions.

BACKGROUND ART

There are publicly known techniques in which an oxygen sensor that detects the oxygen concentration in exhaust gases is provided downstream of a sensor provided in an exhaust system of an internal combustion engine and the air/fuel ratio upstream of the catalyst of the internal combustion engine is forcedly set to a rich condition or a lean condition on the basis of a detected value of this oxygen sensor, thereby to evaluate the deterioration condition of the catalyst (refer to, for example, the Japanese Patent Laid-Open No. H6-129285).

In this conventional apparatus for evaluating the deterioration condition of a catalyst of an internal combustion engine, after the oxygen sensor outputs a detected value of a lean condition or a rich condition, the air/fuel ratio control is reversed so that a target air/fuel ratio becomes a rich condition or a lean condition after a lapse of a predetermined time.

DISCLOSURE OF THE INVENTION

In the conventional apparatus for evaluating the deterioration condition of a catalyst of an internal combustion engine, however, the air/fuel ratio control is not reversed until a predetermined time elapses and this predetermined time is not changed according to the operation condition (load condition) of an internal combustion engine. Therefore, the control condition of a lean air/fuel ratio or a rich air/fuel ratio is continued more than necessary and a delay occurs in the start of reverse control, thereby posing the problem that there is a possibility that emissions might be worsened.

In the case of irregularities in the flow of exhaust gases, for example, when exhaust gases flow so as to hit nonuniformly against the above-described oxygen sensor that detects the oxygen storage capacity (hereinafter referred to "OSC" as required) of a catalyst, the output of the oxygen sensor becomes dependent on a local OSC condition and is reversed, with the result that there is a possibility that the OSC of the whole catalyst might be incapable of being measured. That is, the conventional apparatus for evaluating the deterioration condition of a catalyst of an internal combustion engine had the problem that there is a possibility that the OSC that the catalyst has might not be completely used up and there is a possibility that the accuracy of an evaluation of the deterioration condition of the catalyst might decrease.

Furthermore, in the conventional apparatus for evaluating the deterioration condition of a catalyst of an internal combustion engine, particularly when the load of the internal engine is light, changes in the output of the oxygen sensor downstream of the catalyst are not stable if the air/fuel ratio upstream of the catalyst is controlled to a rich condition, that is, the output of the oxygen sensor does not show what is called Z characteristics to changes in the oxygen concentration, thereby posing the problem that there is a possibility that the accuracy of an evaluation of the deterioration condition might decrease.

The present invention has been made in view of the foregoing and has as its object the provision of an apparatus for evaluating the deterioration condition of a catalyst of an internal combustion engine that can improve the accuracy of an evaluation of the deterioration condition of a catalyst and can suppress a worsening of emissions.

To solve the above-described problems and achieve the object, the apparatus for evaluating the deterioration condition of a catalyst of an internal combustion engine related to claim 1 of the invention is an apparatus for evaluating the deterioration condition of a catalyst of an internal combustion engine that forcedly sets the air/fuel ratio upstream of a catalyst provided in an exhaust system of an internal combustion engine to a rich condition or a lean condition on the basis of a detected value of oxygen concentration detection means downstream of the catalyst in the internal combustion engine and evaluates the oxygen storage capacity of the catalyst from the detected value of the oxygen concentration detection means, which is characterized in that the oxygen concentration detection means downstream of the catalyst reversely outputs a detected value thereof from a lean condition to a rich condition or from a rich condition to a lean condition and reverses air/fuel ratio control so that the air/fuel ratio upstream of the catalyst becomes a lean condition or a rich condition when an integrated value of an absorbed oxygen volume of the catalyst or an integrated value of a released oxygen volume after a predetermined timing has reached a predetermined value.

The apparatus for evaluating the deterioration condition of a catalyst of an internal combustion engine related to claim 2 of the invention is characterized in that in the invention described in claim 1, the predetermined timing is a timing at which the oxygen concentration detection means downstream of the catalyst reversely outputs an output thereof from a lean condition to a rich condition or from a rich condition to a lean condition and in that the integrated value of an absorbed oxygen volume or the integrated value of a released oxygen volume is an integrated value of an admitted air volume of the internal combustion engine.

The apparatus for evaluating the deterioration condition of a catalyst of an internal combustion engine related to claim 3 of the invention is characterized in that in the invention described in claim 2, the integrated value of an admitted air volume is changed for each load region of the internal combustion engine.

The apparatus for evaluating the deterioration condition of a catalyst of an internal combustion engine related to claim 4 of the invention is characterized in that in the invention described in claim 1, the predetermined timing is a timing at which the air/fuel ratio upstream of the catalyst is reversed from a rich condition to a lean condition or from a lean condition to a rich condition and in that the integrated value of an absorbed oxygen volume or the integrated value of a released oxygen volume is an integrated value of an admitted air volume of the internal combustion engine.

According to the apparatus for evaluating the deterioration condition of a catalyst of an internal combustion engine related to the invention (claim 1), the oxygen concentration detection means downstream of the catalyst reversely outputs the detected value from a lean condition to a rich condition or from a rich condition to a lean condition and can evaluate, with good accuracy, the OSC which the catalyst has on the basis of an integrated value of an absorbed oxygen volume of the catalyst or an integrated value of a released oxygen volume after a predetermined timing. Also, it is possible to suppress a worsening of emissions by using up the OSC which the catalyst has.

According to the apparatus for evaluating the deterioration condition of a catalyst of an internal combustion engine related to the invention (claim 2), it is possible to evaluate the deterioration condition of the catalyst with good accuracy on the basis of an integrated value of an admitted air volume after the oxygen concentration detection means downstream of the catalyst reversely outputs an output thereof from a lean condition to a rich condition or from a rich condition to a lean condition.

According to the apparatus for evaluating the deterioration condition of a catalyst of an internal combustion engine related to the invention (claim 3), by adjusting the integrated value of an admitted air volume according to changes in the load of the internal combustion engine, it is possible to minimize a worsening of emissions that can occur by maintaining the air/fuel ratio upstream of the catalyst in a lean condition when the air/fuel ratio downstream of the catalyst is in a lean condition or by maintaining the air/fuel ratio in a rich condition when the air/fuel condition downstream of the catalyst is in a rich condition.

According to the apparatus for evaluating the deterioration condition of a catalyst of an internal combustion engine related to the invention (claim 4), it is possible to evaluate the deterioration condition of the catalyst with good accuracy on the basis of an integrated value of an admitted air volume after the air/fuel ratio upstream of the catalyst is reversed from a rich condition to a lean condition or from a lean condition to a rich condition.

BEST MODE FOR CARRYING OUT THE INVENTION

Embodiments of an apparatus for evaluating the deterioration condition of an internal combustion engine related to the invention will be described below on the basis of the drawings. It should be noted that the invention is not limited by these embodiments.

Embodiment 1

Figure 2:
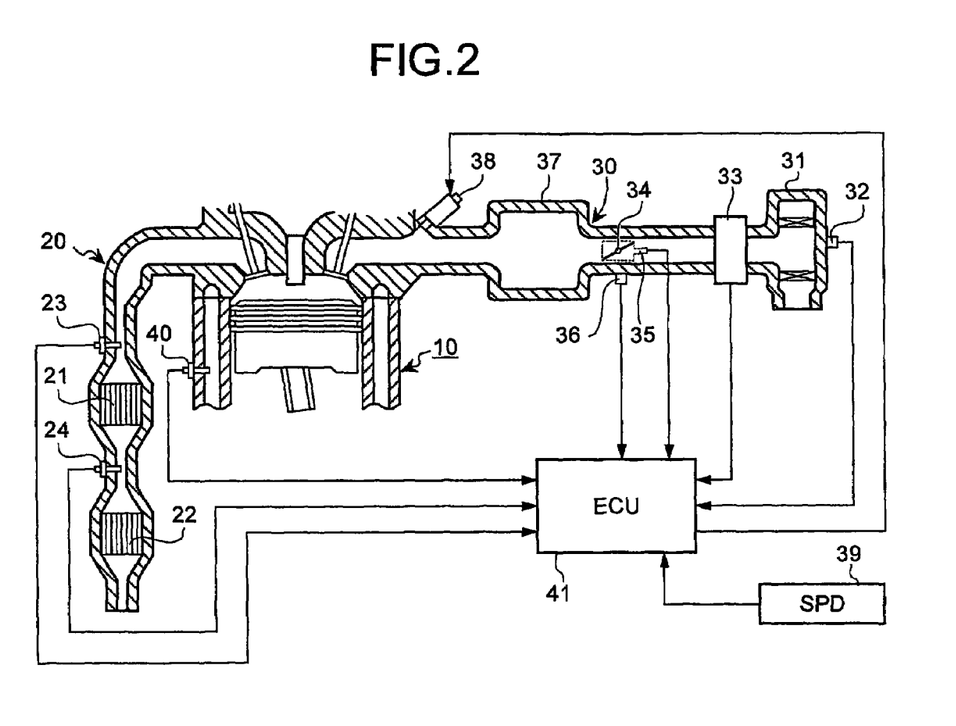
FIG. 2 is a schematic illustration of an internal combustion engine in which an apparatus for evaluating the deterioration condition of a catalyst is mounted.

FIG. 2 is a schematic illustration of an internal combustion engine in which an apparatus for evaluating the deterioration condition of a catalyst related to Embodiment 1 of the invention is mounted. As shown in FIG. 2, an internal combustion engine 10 is provided with an air intake passage 30 and an air exhaust passage 20. In the air exhaust passage 20, an upstream catalyst 21 and a downstream catalyst 22 are arranged in series in order to clean exhaust gases. That is, exhaust gases discharged from the internal combustion engine 10 are cleaned first by the upstream catalyst 21 and exhaust gases incapable of being cleaned by this upstream catalyst 21 are cleaned by the downstream catalyst 22.

These catalysts 21, 22 can store predetermined amount of oxygen and are constructed in such a manner that when unburned components such as hydrocarbon (HC) and carbon monoxide (CO) are contained in exhaust gases, these unburned components are oxidized by using the stored oxygen and when oxidized components such as nitrogen oxides (NOx) are contained in exhaust gases, these oxidized components are reduced and released oxygen can be stored.

Upstream of the upstream catalyst 21, there is provided an air/fuel ratio sensor that detects the oxygen concentration in exhaust gases (hereinafter referred to as a "main $O_2$ sensor") 23. That is, this main $O_2$ sensor 23 detects the air/fuel ratio of an air-fuel mixture burned in the internal combustion engine on the basis of the oxygen concentration of the exhaust gases that flow into the upstream catalyst 21.

Downstream of the upstream catalyst 21, there is provided an air/fuel ratio sensor that detects the oxygen concentration in exhaust gases (hereinafter referred to as a "sub $O_2$ sensor") 24. That is, on the basis of the oxygen concentration of the exhaust gases that have flown out of the upstream catalyst 21, this sub $O_2$ sensor 24 detects whether the exhaust gases are fuel rich exhaust gases (exhaust gases containing HC and CO) or fuel lean exhaust gases (exhaust gases containing NOx). Also the upstream catalyst 21 is provided with a temperature sensor that detects exhaust gas temperature (not shown).

In the air intake passage 30, there are provided an air filter 31, an intake-air temperature sensor 32 that detects intake-air temperature, an air flow meter 33 that detects an intake air volume, a throttle valve 34, a throttle sensor 35 that detects throttle opening, an idle switch 36 that detects the fully closed condition of the throttle valve 34, a surge tank 37, a fuel injection valve 38, etc.

Various sensors such as the above-described $O_2$ sensors 23, 24, a vehicle speed sensor 39 and a cooling water temperature sensor 40 are connected to an electrical control unit (ECU) 41, which controls the internal combustion engine 10 on the basis of output values of these sensors and performs an evaluation of the deterioration condition of the catalysts.

The upstream catalyst 21 cleans exhaust gases by releasing oxygen into fuel rich exhaust gases and storing excessive oxygen in fuel lean exhaust gases. For this reason, the cleaning capacity of the upstream catalyst 21 decreases with a decrease in the maximum oxygen volume capable of being stored by the upstream catalyst 21, i.e., the oxygen storage capacity (hereinafter abbreviated as OSC) of the upstream catalyst 21.

Therefore, it is important to estimate the condition of the OSC which this upstream catalyst 21 has as accurately as possible and to forcedly operate a target air/fuel ratio in a rich condition or a lean condition on the basis of the estimation. However, as described above, in the case of irregularities in the flow of exhaust gases, for example, when exhaust gases flow so as to hit nonuniformly against the sub $O_2$ sensor 24 that detects the condition of the OSC, the output of the sub $O_2$ sensor 24 becomes dependent on a local OSC condition and is reversed, with the result that there is a possibility that the OSC (a net value of $O_2$ storage capacity, Cmax) of the whole upstream catalyst 21 might be incapable of being measured.

That is, there is a possibility that the OSC which the upstream catalyst 21 has might not be completely used up.

Hence, in Embodiment 1, in order to use up the whole of the OSC which is only partially used, a control target of the air/fuel ratio (hereinafter referred to as "target A/F") is reversed after a predetermined delay after the reversing of the output of the sub $O_2$ sensor 24 in order to reverse the air/fuel ratio upstream of the upstream catalyst 21, and this delay is set on the basis of an integrated intake air volume (the amount of exhaust gas) that passes through the upstream catalyst 21.

Figure 1:
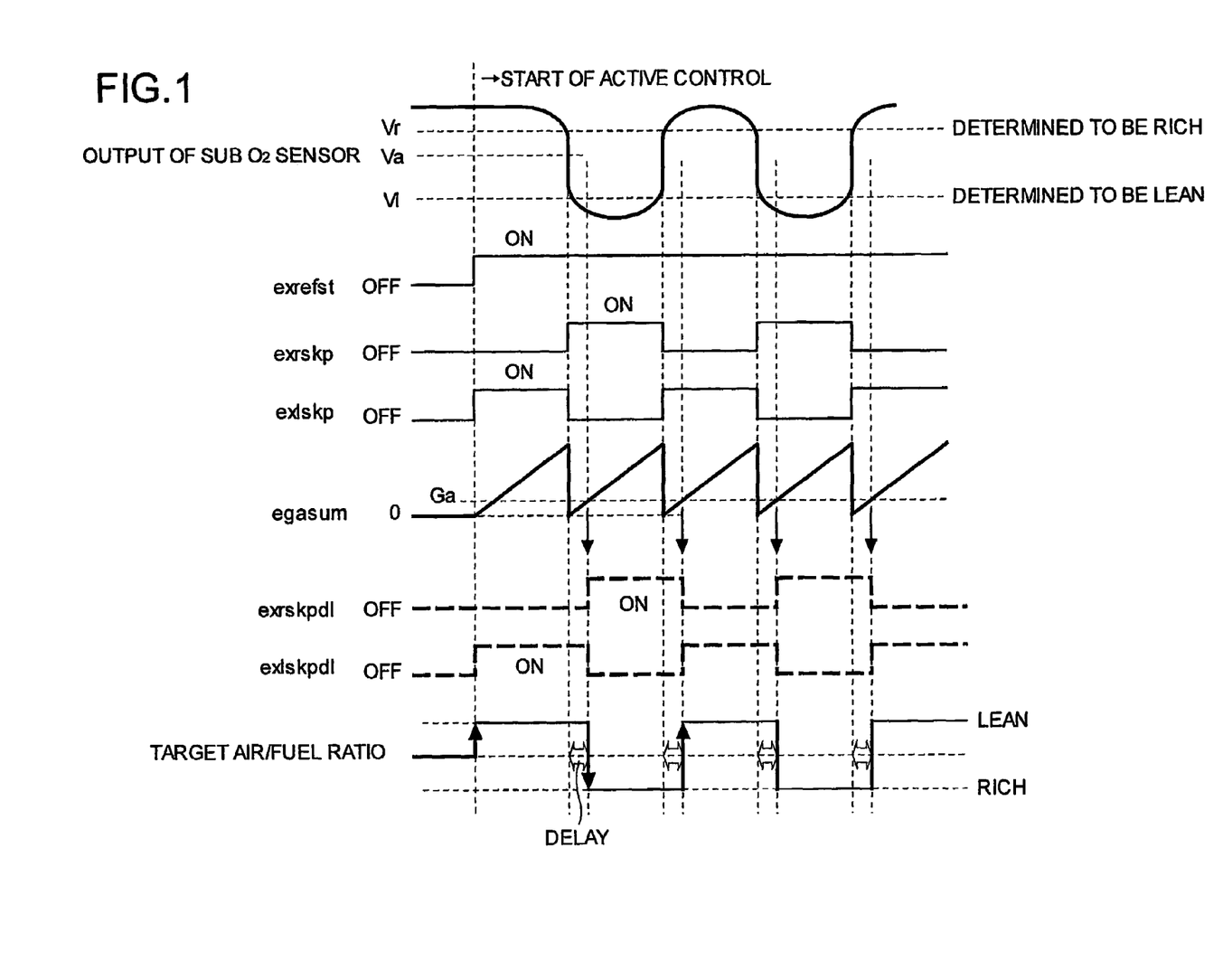
FIG. 1 is a time chart that shows the concept of delay control.
Figure 3:
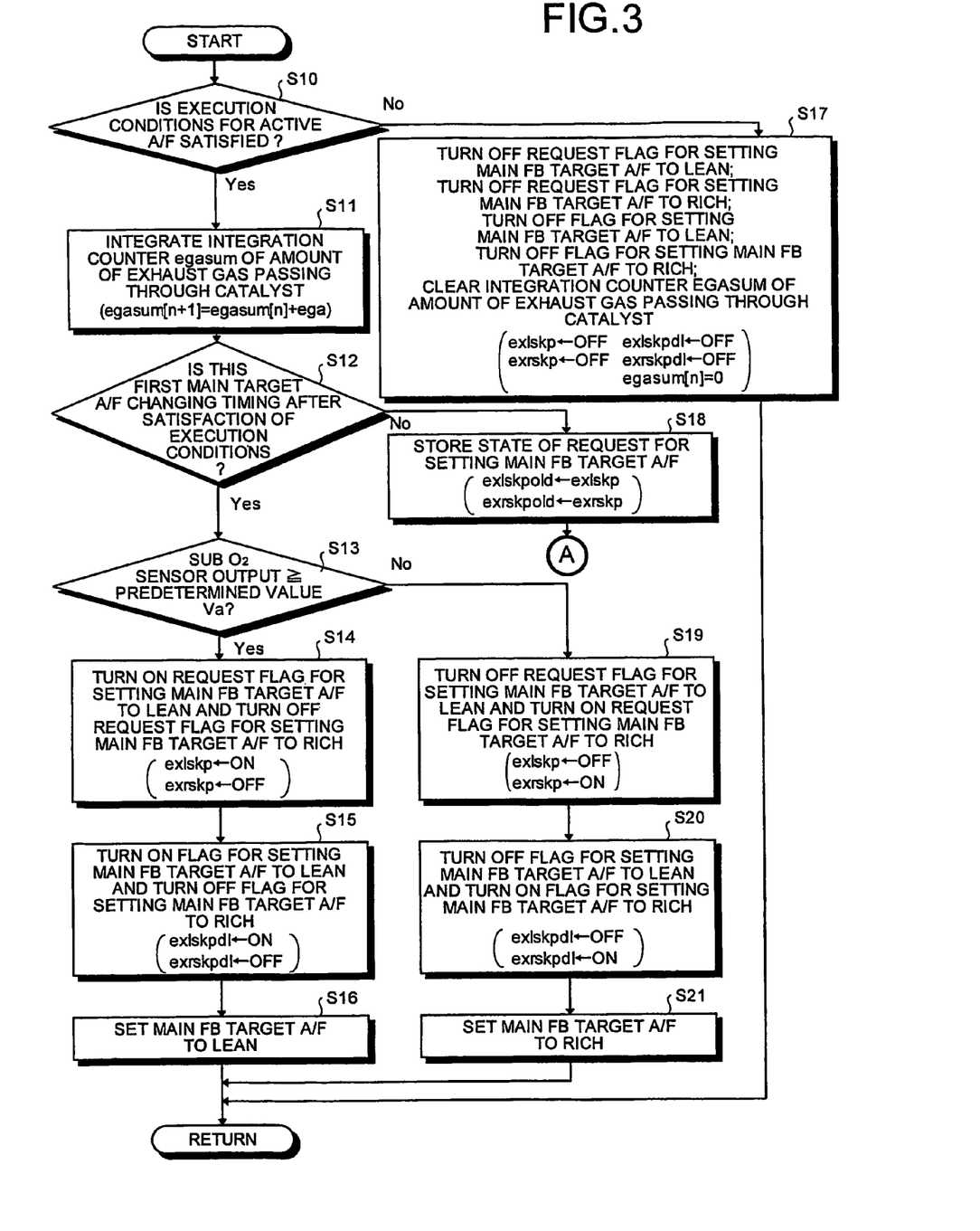
FIG. 3 is a flow chart of control operations related to Embodiment 1.
Figure 4:
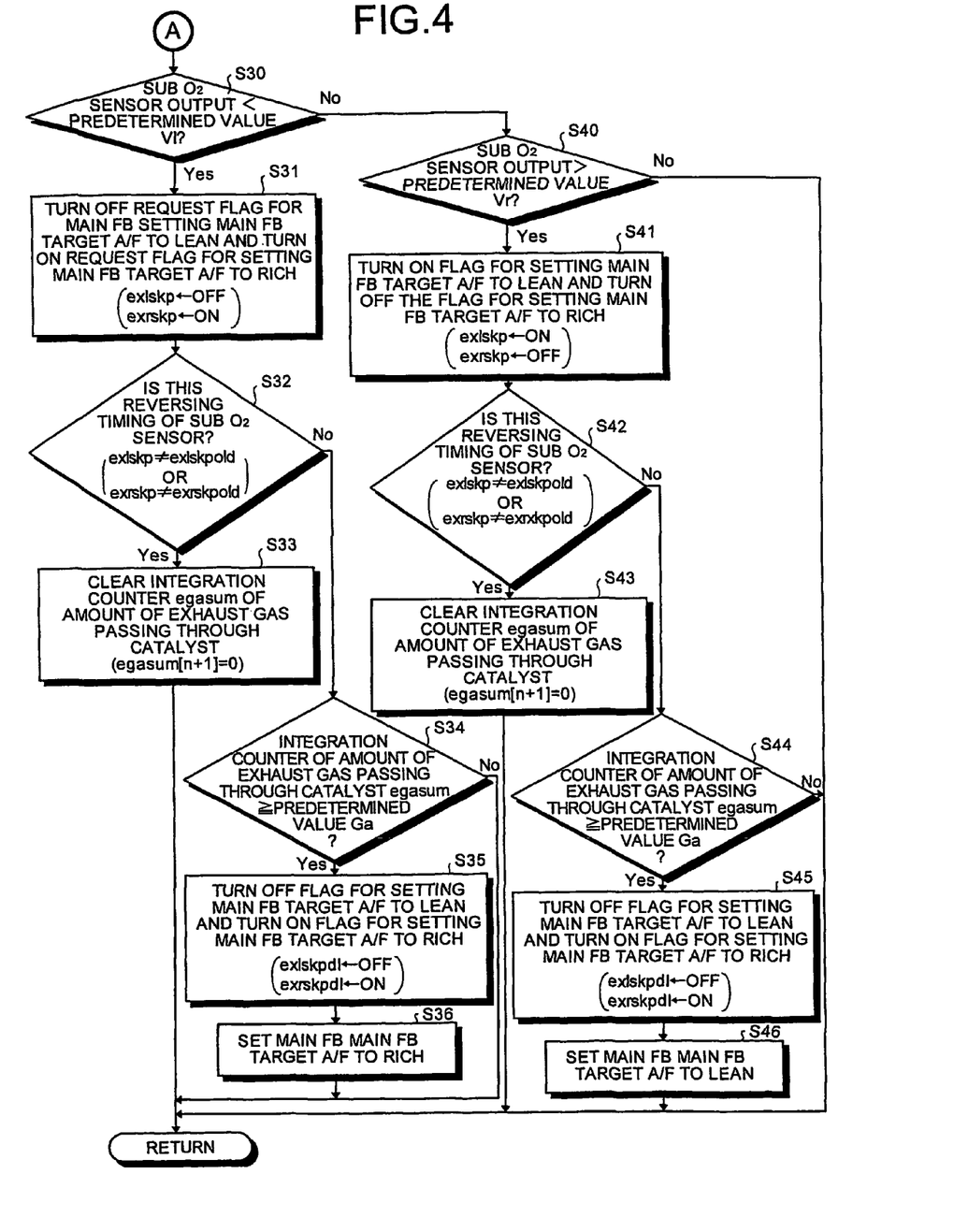
FIG. 4 is a flow chart of control operations related to Embodiment 1.

Control operations related to Embodiment 1 will be described below on the basis of FIGS. 1, 3 and 4. FIG. 1 is a time chart that shows the concept of delay control, and FIGS. 3 and 4 are each a flow chart of control operations related to Embodiment 1. The control related to Embodiment 1 is hereinafter referred to as "active A/F control." As shown in FIGS. 3 and 4, first, a determination is made whether execution conditions for active A/F control hold (Step S10). The flag "exrefst" (refer to FIG. 1) is a flag that becomes on when the execution conditions for active A/F control is satisfied.

If the execution conditions for active A/F control is not satisfied ("No" in Step S10), the control operations are returned to START through Step S17. That is, in Step S17, a request flag 'exlskp' for setting the target A/F of main feedback control (written as "main FB" in the figures) to a lean condition is turned off, a request flag 'exrskp' for setting the target A/F of main feedback control to a rich condition is turned off, a flag 'exlskpdl' for setting the target A/F of main feedback control to a lean condition is turned off, a flag 'exrspdl' for setting the target A/F of main feedback control to a rich condition is turned off, and an integration count 'egasum' of the amount of exhaust gas passing through the catalysts (the upstream catalyst 21 and the downstream catalyst 22) necessary for setting a delay volume, which will be described later is cleared (0 is substituted in egasum [n], where n is an integer). In this manner, by turning off each of the above-described flags and clearing the integration count 'egasum' of the amount of exhaust gas passing through the catalyst 21, preparations are made for active A/F control.

If execution conditions for active A/F control is satisfied and the flag 'exrefst' is on ("Yes" in Step S10), integration of the amount of exhaust gas (amount of intake air) that passes through the upstream catalyst 21 is performed by clearing the integration count 'egasum' (egasum [n+1]=egasum [n]+ega, ega is a predetermined passing exhaust gas amount) (Step S11).

Next, a determination is made whether this is the first target A/F changing timing after satisfaction of execution conditions for Step S10 at which a shift is made from a usual feedback control state to an active control state. If this is the first target A/F changing timing ("Yes" in Step S12), a determination is made whether the output of the sub $O_2$ sensor 24 is not less than a predetermined value Va (Step S13). An optimum value is set beforehand by an experiment and the like as this preset value Va.

If the output of the sub $O_2$ sensor 24 is not less than a predetermined value Va ("Yes" in Step S13), the flag 'exlskp' is turned on and the flag 'exrskp' is turned off (Step S14). And furthermore, the flag 'exlskpdl' is turned on and the flag 'exrskpdl' is turned off (Step S15). By setting each of the above-described flags in this manner, the target A/F of main feedback control is set to a lean condition and the operations are returned to START (Step S16). For example, if the target A/F during usual stoichiometric control is 14.6 or so, the control target value is set at 15.1 or so.

On the other hand, unless the output of the sub $O_2$ sensor 24 is not less than a predetermined value Va ("No" in Step S13), the flag 'exlskp' is turned off and the flag 'exrskp' is turned on (Step S19). And furthermore, the flag 'exlskpdl' is turned off and the flag 'exrskpdl' is turned on (Step S20). By setting each of the above-described flags in this manner, the target A/F of main feedback control is set to a rich condition and the operations are returned to START (Step S21). For example, if the target A/F during usual stoichiometric control is 14.6 or so, the control target value is set at 14.1 or so.

If this is not the first target A/F changing timing after satisfaction of execution conditions in Step S10 above, that is, if this is after the first target A/F change ("No" in Step S12), the state of the request for target A/F setting at this point of time is stored (Step S18). That is, flag 'exlskp' is substituted in a flag 'exlskpold', at the same time flag 'exrskp' is substituted in the 'exrskpold', and these are stored.

And as shown in FIG. 4, a determination is made whether the output of the sub $O_2$ sensor 24 is less than a predetermined value Vl, which is a threshold value when the target A/F is reversed to the rich side (Step S30). An optimum value is set beforehand by an experiment and the like as this predetermined value Vl.

If the output of the sub $O_2$ sensor 24 is less than the predetermined value Vl ("Yes" in Step S30), the flag 'exlskp' is turned off and the flag 'exrskp' is turned on (Step S31).

Subsequently, a determination is made whether the output of the sub $O_2$ sensor 24 has been reversed (Step S32). That is, if the flag 'exlskpold' stored in Step S18 above is different from the flag 'exlskp' set in Step S31 above or if the flag 'exrskpold' stored in Step S18 above is different from the flag 'exrskp' set in Step S31 above, it can be determined that the output of the sub $O_2$ sensor 24 has been reversed.

When the output of the sub $O_2$ sensor 24 has been reversed ("Yes" in Step S32), the integration count 'egasum' of the amount of exhaust gas passing through the upstream catalyst 21 is cleared (0 is substituted in egasum [n+1]) and the operations are returned to START (Step S33).

On the other hand, if this is not the reversing timing of the output of the sub $O_2$ sensor 24 ("No" in Step S32), that is, if a lean condition is continued after reversing to the lean condition, a determination is made whether a reading of the integration count 'egasum' of the amount of exhaust gas passing through the upstream catalyst 21 is not less than a predetermined value Ga (Step S34). Unless the integration count 'egasum' is not less than the predetermined value Ga ("No" in Step S34), there is a possibility that the OSC has not been used up. Therefore, the target A/F is not reversed to the rich side and the operations are returned to START.

If the integration count 'egasum' is not less than a predetermined value Ga ("Yes" in Step S34), it can be determined that the OSC has been used up and, therefore, the flag 'exlskpdl' for setting the target A/F to a lean condition is turned off and the flag 'exrskpdl' for setting the target A/F to a rich condition is turned on (Step S35).

In this manner, the OSC of the upstream catalyst 21 can be used up by performing the routine of Step S34 above until the integration count 'egasum' becomes not less than a predetermined value Ga, thereby to ensure a predetermined delay, and by delaying the timing of reversing the target A/F using this time lag. And each of the flags is set as described above, the target A/F is set at a rich condition, and the operations are returned to START (Step S36). For example, if the target A/F during usual stoichiometric control is 14.6 or so, the control target value is set at 14.1 or so.

If in the determination of Step S30 above, the output of the sub $O_2$ sensor 24 is not less than a predetermined value Vl ("No" in Step S30), a determination is further made whether the output of this sub $O_2$ sensor 24 exceeds a predetermined value Vr, which is a threshold value when the target A/F is reversed to the lean side (Step S40). A minimum value is set beforehand by an experiment and the like as this predetermined value Vr.

If the output of the sub $O_2$ sensor 24 exceeds a predetermined value Vr ("Yes" in Step S40), the flag 'exlskp' for setting the target A/F to a lean condition is turned on and the flag 'exrskp' for setting the target A/F to a rich condition is turned off (Step S41).

Subsequently, a determination is made whether the output of the sub $O_2$ sensor 24 has been reversed (Step S42). That is, if the flag 'exlskpold' stored in Step S18 above is different from the flag 'exlskp' set in Step S31 above or if the flag 'exrskpold' stored in Step S18 above is different from the flag 'exrskp' set in Step S31 above, it can be determined that the output of the sub $O_2$ sensor 24 has been reversed.

When the output of the sub $O_2$ sensor 24 has been reversed ("Yes" in Step S42), the integration count 'egasum' of the exhaust gas volume passing through the upstream catalyst 21 is cleared (0 is substituted in egasum [n+1]) and the operations are returned to START (Step S43).

On the other hand, if the output of the sub $O_2$ sensor 24 has not been reversed to the lean side ("No" in Step S42), that is, if a rich condition is continued after reversing to the rich condition, a determination is made whether the integration count 'egasum' of the amount of exhaust gas passing through the upstream catalyst 21 is not less than a predetermined value Ga (Step S44). Unless the integration count 'egasum' is not less than the predetermined value Ga ("No" in Step S44), there is a possibility that the OSC has not been used up. Therefore, the target A/F is not reversed to the lean side and the operations are returned to START.

If the integration count 'egasum' is not less than a predetermined value Ga ("Yes" in Step S44), it can be determined that the OSC has been used up and, therefore, the flag 'exlskpdl' for setting the target A/F to a lean condition is turned on and the flag 'exrskpdl' for setting the target A/F to a rich condition is turned off (Step S45).

In this manner, the OSC of the upstream catalyst 21 can be used up by performing the routine of Step S44 above until the integration count 'egasum' becomes not less than a predetermined value Ga, thereby to ensure a predetermined delay, and by delaying the timing of reversing the target A/F using this time lag. And each of the flags is set as described above, the target A/F is set at a lean condition, and the operations are returned to START (Step S46). For example, if the target A/F during usual stoichiometric control is 14.6 or so, the control target value is set at 15.1 or so.

In Embodiment 1, integration is performed by setting a constant value as the delay and giving a predetermined weight factor for each load region as a value of an integrated air volume of the integration count 'egasum' that determines the amount of delay. That is, when the load is high, a weight factor in the direction in which the integrated air volume increases is given in consideration of the fact that the response of the sub $O_2$ sensor 24, whereas a weight factor in the direction in which the integrated air volume decreases is given when the load is low. As a result of this, because it is possible to arbitrarily adjust the integration speed of a delay according to changes in load, the occurrence of a useless delay can be avoided as far as possible and the possibility of a worsening of emissions can be minimized.

Figure 5:
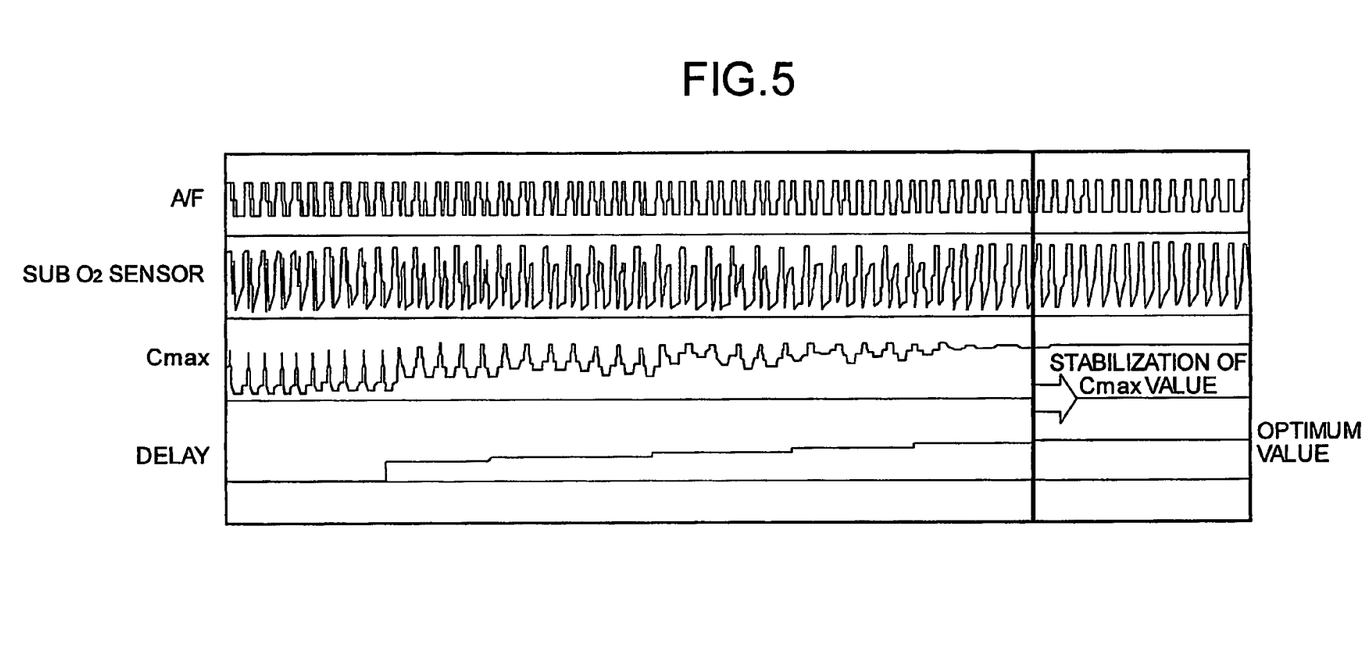
FIG. 5 is a graph that shows the relationship between the delay volume and the value of $O_2$ storage capacity Cmax.

Next, the effect of Embodiment 1 will be described on the basis of FIG. 5. FIG. 5 is a graph that shows the relationship between the delay and the value of $O_2$ storage capacity Cmax. In the figure, the air/fuel ratio A/F and the output of the sub $O_2$ sensor 24 are also shown. As shown in the figure, it is apparent that by setting an optimum delay (an optimum value of an integrated air volume after the reversing of the output of the sub $O_2$ sensor 24) in a predetermined load region, the $O_2$ storage capacity Cmax, which has shown great fluctuations of value, becomes stable behind the white arrow in the figure.

As described above, according to the apparatus for evaluating the deterioration condition of a catalyst of an internal combustion engine related to Embodiment 1, the deterioration condition of a catalyst can be evaluated with good accuracy by using up the $O_2$ storage capacity (OSC) which the upstream catalyst 21 has and stabilizing a calculated OSC.

Furthermore, because the integration speed of the delay is arbitrarily adjusted according to changes in the load of the internal combustion engine 10, the occurrence of a useless delay volume can be avoided as far as possible and the possibility of a worsening of emissions can be minimized.

In Embodiment 1, the delay volume was defined by the reaching of an integrated air volume after the reversing of the output of the sub $O_2$ sensor 24. However, the invention is not limited to this, and the delay volume may be defined, for example, by a lapse of a predetermined time after the reversing of the output of the sub $O_2$ sensor 24 (timer control). Also, the delay may be defined as a change in the accumulated oxygen volume after the reversing of the output of the sub $O_2$ sensor 24.

Also, the above description was made on the assumption that when a constant value is set as the amount of delay, integration is performed by giving a predetermined weight factor for each load region as a value of an integrated air volume of the integration count 'egasum' that determines the amount of delay.

Embodiment 2

The construction of the internal combustion engine 10 and its apparatus for evaluating the deterioration condition of a catalyst are the same as the construction shown FIG. 2 of Embodiment 1. Therefore, the same items as already described or equivalent thereto are given like reference numerals and their overlapping descriptions are omitted or simplified.

Figure 6:
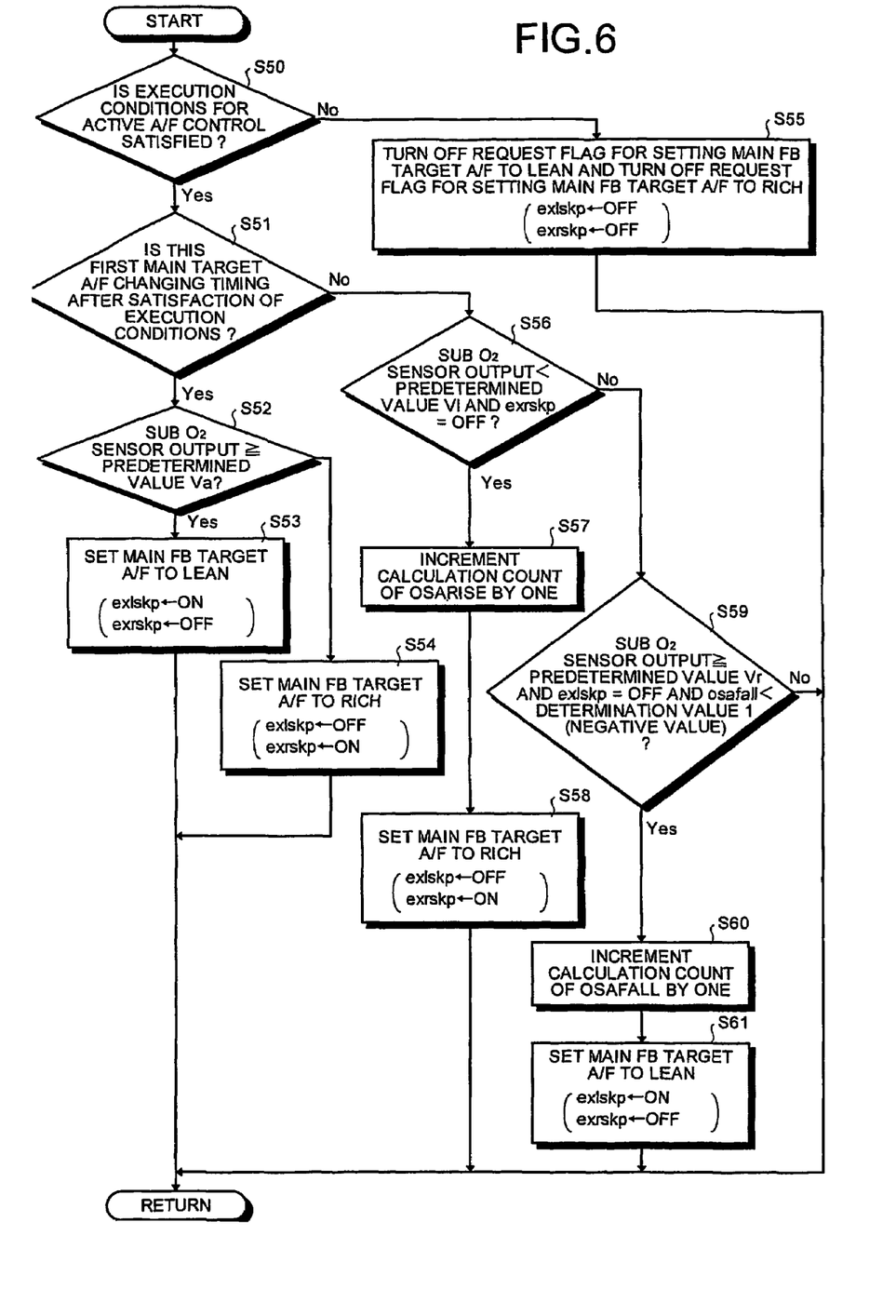
FIG. 6 is a flow chart of control operations related to Embodiment 2 of the invention.
Figure 7:
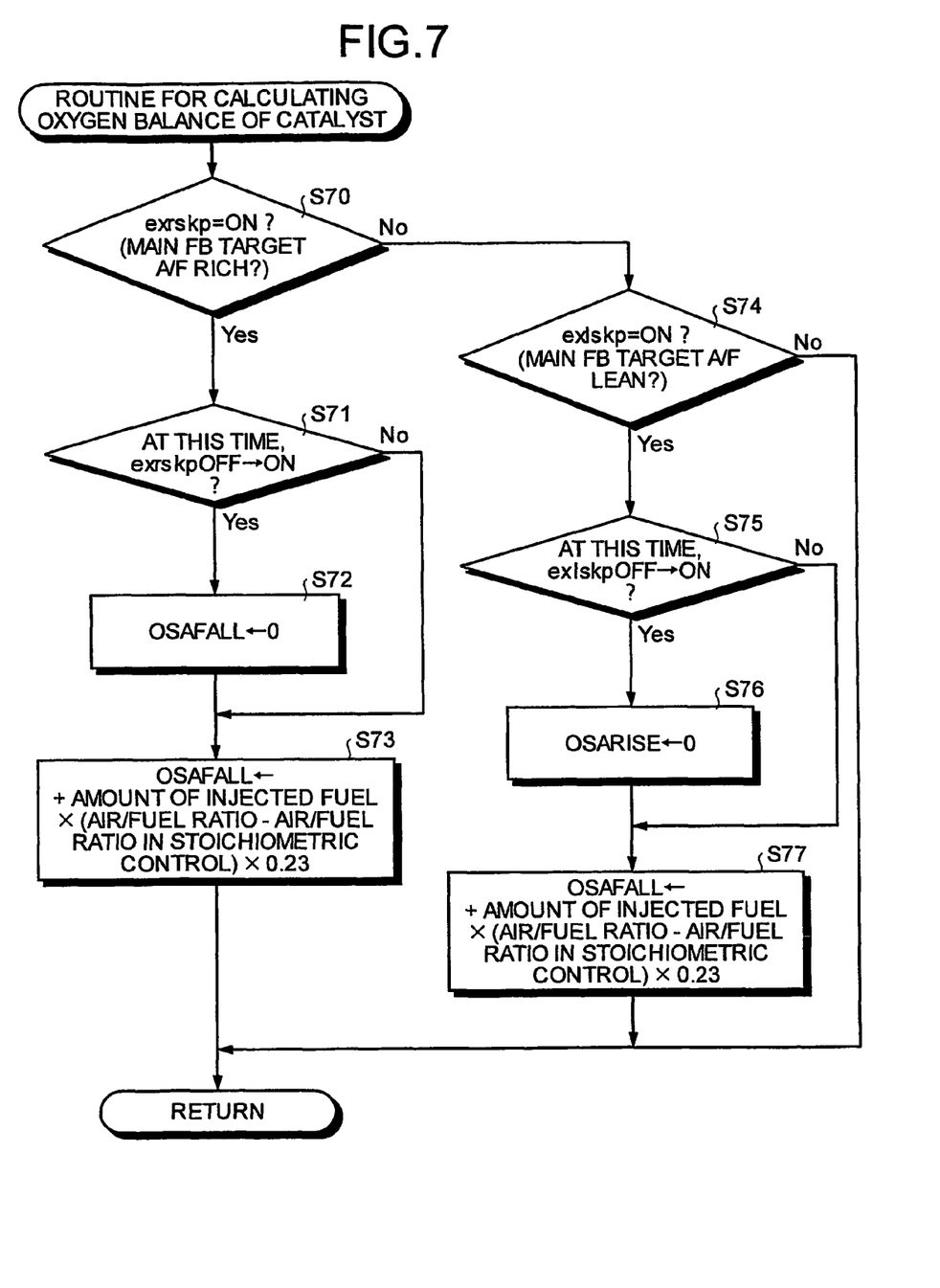
FIG. 7 is a flow chart that shows a routine for calculating the oxygen balance of a catalyst.
Figure 8:
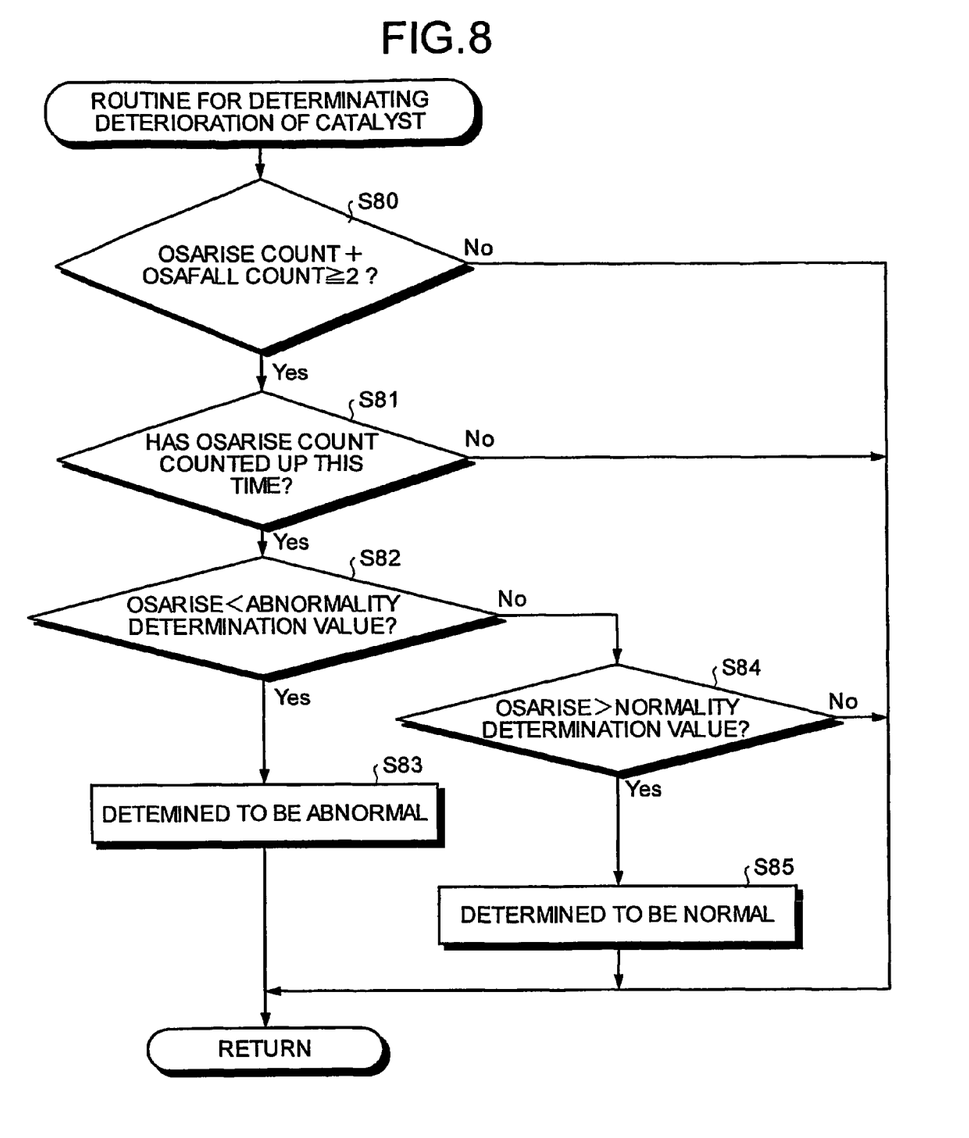
FIG. 8 is a flow chart that shows a routine for judging the deterioration of a catalyst.

FIG. 6 is a flow chart of control operations related to Embodiment 2 of the invention, and the flow chart shows a routine for calculating the target A/F of main feedback control (main FB). FIG. 7 is a flow chart that shows a routine for calculating the oxygen balance of a catalyst, FIG. 8 is a flow chart that shows a routine for judging the deterioration of a catalyst, and FIG. 9 a time chart of the concept of control.

When the air/fuel ratio of the upstream catalyst 21 is controlled to a rich condition, particularly in a case where the load of the internal engine 10 is light, sometimes changes in the output of the sub $O_2$ sensor 24 were not stable, that is, the output of the sub $O_2$ sensor 24 did not show what is called Z characteristics to changes in the oxygen concentration, thereby reducing the accuracy of an evaluation of the deterioration condition. Embodiment 2 provides means for solving such problems.

When the oxygen concentration of exhaust gases downstream of the upstream catalyst 21 was measured during the control of the air/fuel ratio of the upstream catalyst 21 in an experiment, it was ascertained that the output of the sub $O_2$ sensor 24 increases and is reversed to the rich side although the oxygen concentration shows a lean condition. In contrast to this, it was ascertained that when the air/fuel ratio of the upstream catalyst 21 is controlled to a lean condition after the output of the sub $O_2$ sensor 24 becomes a rich condition, the output of the sub $O_2$ sensor 24 changes accurately because the output is reversed to the lean side when the oxygen concentration of exhaust gases downstream of the upstream catalyst 21 changes to be lean largely.

Because there is a correlation between the output of the sub $O_2$ sensor 24 and an actual air/fuel ratio downstream of the upstream catalyst 21 in this manner, in Embodiment 2, the amount of oxygen (an absorbed oxygen volume or a released oxygen volume) stored in the upstream catalyst 21 is estimated by utilizing that, for example, the output of the sub $O_2$ sensor 24 is reversed from a rich condition to a lean condition, and control is performed so that the deterioration condition of the upstream catalyst 21 can be evaluated on the basis of this estimated value. This control method will be concretely described below on the basis of FIGS. 6 to 8 with simultaneous reference to FIGS. 2 and 9.

As shown in FIG. 6, first, a determination is made whether execution conditions for active A/F control is satisfied (Step S50). If execution conditions for active A/F control is not satisfied ("No" in Step S50), the operations are returned to START through Step S55. That is, a flag 'exlskp' for setting the target A/F of main feedback control (main FB) to a lean condition is turned off, and a flag 'exrskp' for setting the target A/F of main feedback control to a rich condition is turned off. Preparations are made for active A/F control by turning off each of the flags in this manner.

If execution conditions for active A/F control is satisfied ("Yes" in Step S50), a determination is made whether this is the first target A/F changing timing after satisfaction of execution conditions at which a shift is made from a usual feedback control state to an active control state (Step S51). If this is the first target A/F changing timing ("Yes" in Step S51), a determination is made whether the output of the sub $O_2$ sensor 24 is not less than a predetermined value Va (Step S52).

If the output of the sub $O_2$ sensor 24 is not less than a predetermined value Va ("Yes" in Step S52), the target A/F of main feedback control is set to a lean condition (Step S53) and the operations are returned to START. That is, the flag 'exlskp' is turned on and the flag 'exrskp' is turned off (Step S53), and the operations are then returned to START.

On the other hand, unless the output of the sub $O_2$ sensor 24 is not less than a predetermined value Va ("No" in Step S52), the target A/F of main feedback control is set to a rich condition (Step S54) and the operations are returned to START. That is, the flag 'exlskp' is turned off and the flag 'exrskp' is turned on (Step S54), and the operations are then returned to START.

If this is not the first target A/F changing timing after satisfaction of execution conditions in Step S50 above, that is, if this is after the first target A/F change ("No" in Step S51), a determination is made whether the output of the sub $O_2$ sensor 24 is less than a predetermined value Vl, which is a threshold value when the target A/F is reversed to the rich side, and the flag 'exrskp' for setting the target A/F of main feedback control to a rich condition is off (Step S56).

If the output of the sub $O_2$ sensor 24 is less than a predetermined value Vl and the flag 'exrskp' is off ("Yes" in Step S56), a number of times count for calculating OSARISE, which is an integrated value of an excess oxygen volume, is incremented by one (Step S57).

And the target A/F of main feedback control is set to a rich condition (Step S58) and the operations are returned to START. That is, the flag 'exlskp' is turned off and the flag 'exrskp' is turned on (Step S58), and the operations are then returned to START.

On the other hand, if the conditions that the output of the sub $O_2$ sensor 24 is less than a predetermined value Vl and the flag 'exrskp' is off is not satisfied ("No" in Step S56), a determination is made whether the output of this sub $O_2$ sensor 24 is not less than a predetermined value Vr, which is a threshold value when the target A/F is reversed to the lean side, the flag 'exlskp' for setting the target A/F of main feedback control to a lean condition is off and OSAFALL, which is an integrated value of an insufficient oxygen volume is smaller than a determination value 1 (negative value)(Step S59).

If the conditions of Step S59 above is satisfied ("Yes" in Step S59), the number of times counter for calculating OSAFALL is incremented by one (Step S60). And the target A/F of main feedback control is set to a lean condition (Step S61) and the operations are returned to START. That is, the flag 'exlskp' is turned off and the flag 'exrskp' is turned on (Step S61), and the operations are then returned to START. On the other hand, if the conditions of Step S59 above is not satisfied ("No" in Step S59), this is outside the target of this control and, therefore, the operations are returned to START.

Next, a control routine for calculating the oxygen balance of the upstream catalyst 21 will be described on the basis of FIG. 7 with simultaneous reference to FIG. 9. This routine for calculating the oxygen balance is performed by constantly monitoring the flag 'exrskp' and flag 'exlskp' controlled in FIG. 6.

First, whether the flag 'exrskp' is on is monitored, and if the flag 'exrskp' is on, that is, if the target A/F of main feedback control is set to a rich condition ("Yes" in Step 70), a determination is made whether the flag 'exrskp' has been set from off to on (Step S71) in this control routine.

If the flag 'exrskp' has been set from off to on in this control routine ("Yes" in Step S71), resetting is performed by substituting zero in OSAFALL, which is an integrated value of insufficient oxygen volume (Step S72), OSAFALL as an insufficient oxygen volume is integrated (Step S73), and the operations are returned to START.

If the flag 'exrskp' has not been set from off to on in this control routine ("No" in Step S71), Step S72 above is jumped and the operations go to Step S73. That is, by multiplying a difference between the air/fuel ratio at this point of time and an air/fuel ratio during stoichiometric control by a weight ratio (0.23) of an injected fuel volume to oxygen at this point of time, the insufficient oxygen volume OSAFALL is integrated for each routine that passes Step S73.

On the other hand, if the flag 'exrskp' is not on, that is, if the target A/F of main feedback control has not been set to a rich condition ("No" in Step S70), a determination is made whether the flag 'exlskp' is on, that is, whether the target A/F of main feedback control has been set to a lean condition (Step S74). If the target A/F of main feedback control has not been set to a lean condition ("No" Step S74), the operations are returned to START. If the target A/F of main feedback control has been set to a lean condition ("Yes" Step S74), a determination is made whether the flag 'exlskp' has been set from off to on in this control routine (Step S75).

If the flag 'exlskp' has been set from off to on in this control routine ("Yes" in Step S75), resetting is performed by substituting zero in OSARISE, which is an integrated value of an excess oxygen volume (Step S76), OSARISE as an excess oxygen volume is integrated (Step S77), and the operations are returned to START.

On the other hand, if the flag 'exlskp' has not been set from off to on in this control routine ("No" in Step S75), Step S76 above is jumped and the operations go to Step S77. That is, by multiplying a difference between the air/fuel ratio at this point of time and an air/fuel ratio during stoichiometric control by a weight ratio (0.23) of an injected fuel volume to oxygen at this point of time, the excess oxygen volume OSARISE is integrated for each routine that passes Step S77.

Next, a routine for judging the deterioration of the upstream catalyst 21 will be described on the basis of FIG. 8 with simultaneous reference to FIG. 9. This routine for determining the deterioration of the catalyst is performed by constantly monitoring a number of times counter for calculating OSARISE, an integrated value of an excess oxygen volume, which was calculated in Step S57 in FIG. 6 and a number of times counter for calculating OSAFALL, an integrated value of an insufficient oxygen volume, which was calculated in Step S60.

First, a determination is made whether OSARISE, an integrated value of an excess oxygen volume, and OSAFALL, an integrated value of an insufficient oxygen volume, have been calculated each at least once (Step S80). If the two values have been calculated each at least once ("Yes" in Step S80), a determination is made whether a reading of the number of times count that counts OSARISE, an integrated value of an excess oxygen volume, has been counted up this time (Step S81). If the number of times count that counts OSARISE, an integrated value of an excess oxygen volume, has not been counted up this time ("No" in Step S81), the operations are returned to START.

On the other hand, if the number of times counter that counts OSARISE, an integrated value of an excess oxygen volume, has been counted up this time ("Yes" in Step S81), a determination is made whether the number of times count that counts OSARISE, an integrated value of an excess oxygen volume, exceeds a predetermined abnormality determination value that is determined beforehand (Step S82). When OSARISE, an integrated value of an excess oxygen volume, does not exceed this abnormality determination value ("Yes" in Step S82), the value is determined to be abnormal (Step S83) and the operations are returned to START.

When OSARISE, an integrated value of an excess oxygen volume, exceeds the above-described abnormality determination value ("No" in Step S82), a determination is further made whether OSARISE, an integrated value of an excess oxygen volume, exceeds a predetermined normality determination value (Step S84). If OSARISE, an integrated value of an excess oxygen volume, exceeds a predetermined normality determination value ("Yes" in Step S84), the value is determined to be normal (Step S85) and if OSARISE does not exceed this normality determination value ("No" in Step S84), the operations are returned to START.

Figure 9:
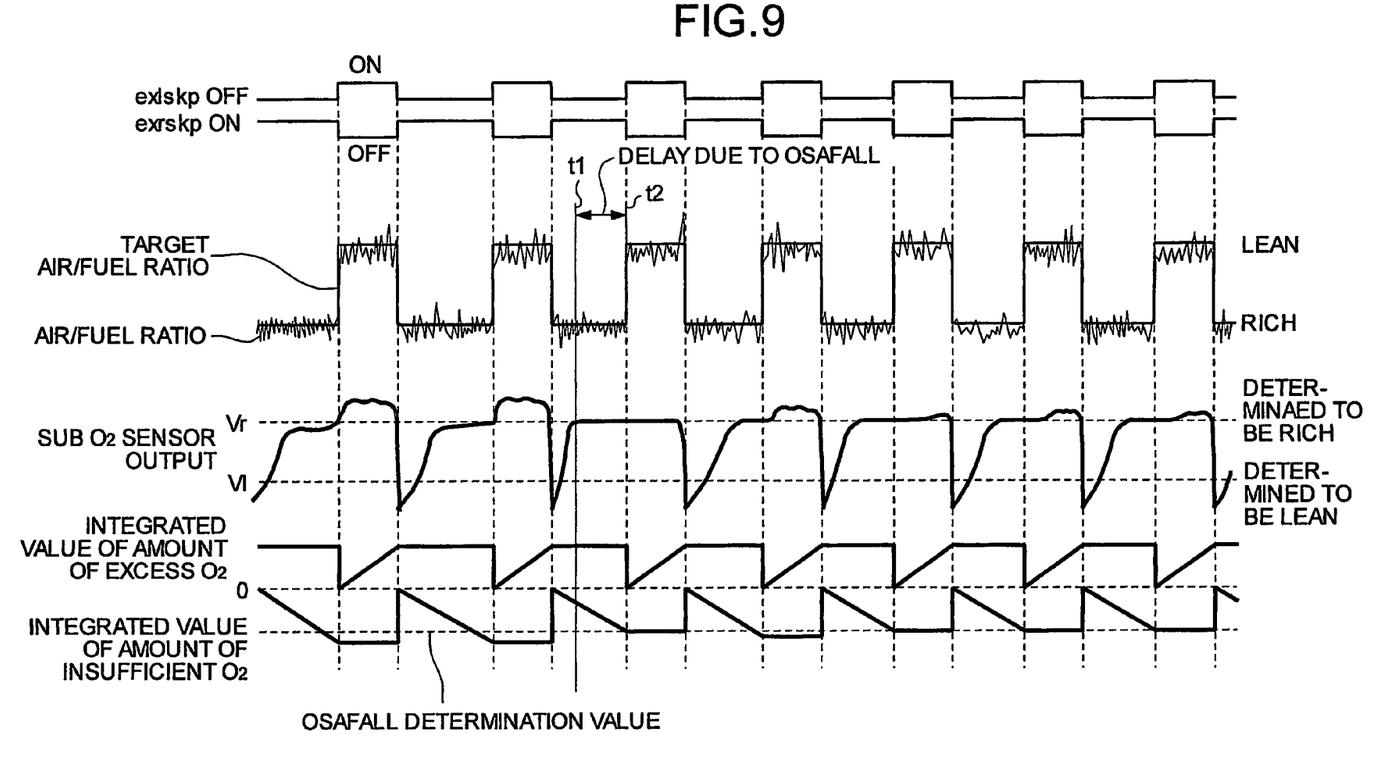
FIG. 9 is a time chart of the concept of control.

As shown in FIG. 9, at a time t2 when OSARISE, an integrated value of an excess oxygen volume, shows a predetermined normality determination value and OSAFALL, an integrated value of an insufficient oxygen volume, has reached a predetermined determination value, the target A/F of the upstream catalyst 21 is reversely controlled to the lean side. That is, at a time t2 after a lapse of a predetermined delay volume (time) from a time t1 in FIG. 9 the target A/F of the upstream catalyst 21 is reversely controlled to the lean side and, therefore, in this delay time the OSC which the upstream catalyst 21 has can be completely used up.

Thus, even in a case where the output of the sub $O_2$ sensor 24 is reversed from the lean side to the rich side, with the upstream catalyst 21 not releasing oxygen sufficiently during the control of the A/F of the upstream catalyst 21 to a rich condition, it is possible to change the control to a lean control after continuing the rich control of the above-described A/F until OSARISE, an integrated value of an excess oxygen volume, (an integrated value of a released oxygen volume) of the upstream catalyst 21 becomes a value sufficient for making an abnormality determination or a normality determination.

As described above, according to the apparatus for evaluating the deterioration condition of a catalyst of an internal combustion engine related to Embodiment 2, even in a case where changes in the output of the sub $O_2$ sensor 24 are not stabilized particularly as when the load of the internal combustion engine 10 is light, it is possible to use up the OSC which the upstream catalyst 21 has and to stabilize a calculated OSC, whereby the deterioration condition of the catalysts 21, 22 can be evaluated with good accuracy.

INDUSTRIAL APPLICABILITY

As described above, the apparatus for evaluating the deterioration condition of a catalyst of an internal combustion engine related to the invention can use up the OSC which the catalyst has and evaluate the deterioration condition of the catalyst with good accuracy and is useful in an internal combustion engine that can suppress a worsening of emissions.

The invention claimed is:

1. An apparatus for evaluating the deterioration condition of a catalyst provided in an exhaust system of an internal combustion engine, the apparatus comprising:
   a catalyst downstream oxygen concentration detector that detects an oxygen concentration of exhaust gas downstream of the catalyst; and
   a controller that determines that an air/fuel ratio of exhaust gas downstream of the catalyst is in fuel rich condition when a detected value of the catalyst downstream oxygen concentration detector is more than a first value, determines that the air/fuel ratio of exhaust gas downstream of the catalyst is in fuel lean condition when a detected value of the catalyst downstream oxygen concentration detector is less than a second value, and controls the internal combustion engine to change an air/fuel ratio of exhaust gas upstream of the catalyst when an integrated value of an intake air volume of the internal combustion engine becomes a predetermined value, the integrated value being integrated until a second timing after the integrated value is reset at a first timing, the second timing being determined based on a determination result of the air/fuel ratio of exhaust gas downstream of the catalyst,
   wherein the first timing is when the determination result of the air/fuel ratio is changed, and the second timing is when the determination result of the air/fuel ratio is subsequently changed,
   the second timing occurring when the integrated value of the intake air volume of the internal combustion engine becomes the predetermined value.

2. The apparatus according to claim 1, wherein the integrated value of the intake air volume is changed for each load region of the internal combustion engine.

3. The apparatus according to claim 1, wherein the integrated value is a time factor, and the third value is a predetermined time period.

4. An apparatus for evaluating the deterioration condition of a catalyst provided in an exhaust system of an internal combustion engine, the apparatus comprising:
   a catalyst downstream oxygen concentration detector that detects an oxygen concentration of exhaust gas downstream of the catalyst;
   a controller that determines that an air/fuel ratio of exhaust gas downstream of the catalyst is in fuel rich condition when a detected value of the catalyst downstream oxygen concentration detector is more than a first value, determines that the air/fuel ratio of exhaust gas downstream of the catalyst is in fuel lean condition when a detected value of the catalyst downstream oxygen concentration detector is less than a second value, and controls the internal combustion engine to change an air/fuel ratio of exhaust gas upstream of the catalyst when an integrated value becomes a third value, the integrated value being integrated until a second timing after the integrated value is reset at a first timing, the second timing being determined based on a determination result of the air/fuel ratio of exhaust gas downstream of the catalyst; and a catalyst upstream air/fuel ratio detector that detects the air/fuel ratio of exhaust gas upstream of the catalyst, wherein the first timing is when the air/fuel ratio detected by the catalyst upstream air/fuel ratio detector is changed from fuel lean condition to fuel rich condition, and the second timing is when the air/fuel ratio subsequently detected by the catalyst upstream air/fuel ratio detector is in fuel lean condition and the air/fuel ratio of exhaust gas downstream of the catalyst is determined to be in fuel rich condition.

5. The apparatus according to claim 4, wherein the integrated value is integrated by a value calculated based on a difference between a current air/fuel ratio and an air/fuel ratio during stoichiometric control and a weight ratio of a current injected fuel volume to current oxygen every integration.

* * * * *